United States Patent
Jones et al.

(10) Patent No.: US 10,777,833 B2
(45) Date of Patent: Sep. 15, 2020

(54) MEMBRANE

(71) Applicants: Johnson Matthey Fuel Cells Limited, London (GB); Centre National de la Recherche Scientifique, Paris (FR); Universite de Montpellier, Montpellier (FR)

(72) Inventors: Deborah Jones, Montpellier (FR); Jacques Roziere, Montpellier (FR); Sara Cavaliere, Montpellier (FR); Surya Subianto, Montpellier (FR); Sarah Burton, Nr Hungerford (GB)

(73) Assignees: Johnson Matthey Fuel Cells Limited, London (GB); Centre National de la Recherche Scientifique, Paris (FR); Universite de Montpellier, Montpellier (FR)

(*) Notice: Subject to any disclaimer, the term of this patent is extended or adjusted under 35 U.S.C. 154(b) by 361 days.

(21) Appl. No.: 15/329,850

(22) PCT Filed: Aug. 4, 2015

(86) PCT No.: PCT/GB2015/052253
§ 371 (c)(1),
(2) Date: Jan. 27, 2017

(87) PCT Pub. No.: WO2016/020668
PCT Pub. Date: Feb. 11, 2016

(65) Prior Publication Data
US 2017/0279142 A1 Sep. 28, 2017

(30) Foreign Application Priority Data
Aug. 4, 2014 (GB) .................. 1413794.7

(51) Int. Cl.
*H01M 8/00* (2016.01)
*H01M 8/106* (2016.01)
(Continued)

(52) U.S. Cl.
CPC ............ *H01M 8/106* (2013.01); *B01D 67/00* (2013.01); *B01D 69/12* (2013.01); *B01J 39/19* (2017.01);
(Continued)

(58) Field of Classification Search
CPC ........ B01D 67/00; B01D 69/12; B01D 71/32; H01M 8/1023
See application file for complete search history.

(56) References Cited

U.S. PATENT DOCUMENTS 6,114,068 A * 9/2000 Yamada .................. H01G 9/155
                                                       252/62.2
6,248,469 B1   6/2001 Formato et al.
(Continued)

FOREIGN PATENT DOCUMENTS

EP       0731520 B1    5/2001
EP       1263066 A2   12/2002
(Continued)

*Primary Examiner* — Cynthia H Kelly
*Assistant Examiner* — Monique M Wills
(74) *Attorney, Agent, or Firm* — BakerHostetler (57) ABSTRACT

An electrolyte membrane including (i) a porous mat of nanofibres, wherein the nanofibres are composed of a non-ionically conducting heterocyclic-based polymer, the heterocyclic-based polymer comprising basic functional groups and being soluble in organic solvent; and (ii) an ion-conducting polymer which is a partially- or fully-fluorinated sulphonic acid polymer. The porous mat is essentially fully impregnated with ion-conducting polymer, and the thickness of the porous mat in the electrolyte membrane is distributed across at least 80% of the thickness of the electrolyte
(Continued)

Schematic representation of an electrolyte membrane of the invention membrane. Such a membrane is of use in a proton exchange membrane fuel cell or an electrolyser.

15 Claims, 5 Drawing Sheets

(51) Int. Cl.

| | |
|---|---|
| H01M 8/1039 | (2016.01) |
| H01M 8/1044 | (2016.01) |
| H01M 8/1023 | (2016.01) |
| H01M 8/1062 | (2016.01) |
| B01D 67/00 | (2006.01) |
| B01D 69/12 | (2006.01) |
| H01M 8/0289 | (2016.01) |
| B01J 39/19 | (2017.01) |
| B01J 39/20 | (2006.01) |
| C08J 5/22 | (2006.01) |
| C08L 27/12 | (2006.01) |
| C08L 79/04 | (2006.01) |
| C25B 13/08 | (2006.01) |
| H01M 8/103 | (2016.01) |
| H01M 8/1032 | (2016.01) |
| H01M 8/1018 | (2016.01) |
| B01D 71/62 | (2006.01) |
| B01D 69/02 | (2006.01) |
| B01D 71/32 | (2006.01) |

(52) U.S. Cl.
CPC ............ *B01J 39/20* (2013.01); *C08J 5/2262* (2013.01); *C08J 5/2268* (2013.01); *C08L 27/12* (2013.01); *C08L 79/04* (2013.01); *C25B 13/08* (2013.01); *H01M 8/0289* (2013.01); *H01M 8/103* (2013.01); *H01M 8/1023* (2013.01); *H01M 8/1032* (2013.01); *H01M 8/1039* (2013.01); *H01M 8/1044* (2013.01); *H01M 8/1062* (2013.01); *B01D 69/02* (2013.01); *B01D 71/32* (2013.01); *B01D 71/62* (2013.01); *B01D 2323/39* (2013.01); *B01D 2323/46* (2013.01); *B01D 2325/14* (2013.01); *B01D 2325/26* (2013.01); *C08J 2327/12* (2013.01); *C08J 2379/04* (2013.01); *C08L 2205/16* (2013.01); *H01M 2008/1095* (2013.01)

(56) References Cited

U.S. PATENT DOCUMENTS

| | | | |
|---|---|---|---|
| 2005/0095486 A1* | 5/2005 | Hamamoto | B01D 69/12 429/483 |
| 2011/0200907 A1* | 8/2011 | Moon | H01B 1/122 429/455 |
| 2012/0231355 A1 | 9/2012 | Lee et al. | |
| 2013/0101918 A1* | 4/2013 | Yandrasits | H01M 8/1023 429/482 |
| 2013/0177834 A1 | 7/2013 | Lee et al. | |
| 2013/0202984 A1* | 8/2013 | Snelson | C25B 9/10 429/480 |
| 2014/0134506 A1 | 5/2014 | Kub | |
| 2015/0064573 A1* | 3/2015 | Kaji | D21H 13/02 429/255 |
| 2015/0303505 A1* | 10/2015 | Lee | H01M 8/1025 429/482 |

FOREIGN PATENT DOCUMENTS

| | | |
|---|---|---|
| EP | 1477515 A1 | 11/2004 |
| EP | 1911864 A1 | 4/2008 |
| JP | 2003528420 A | 9/2003 |
| JP | 2005068396 A | 3/2005 |
| JP | 2012238590 A | 12/2012 |
| KR | 20130110569 A | 10/2013 |
| WO | 0022684 A2 | 4/2000 |
| WO | 2011149732 A2 | 12/2011 |
| WO | 2014104785 A1 | 7/2014 |

* cited by examiner

Effect of the use of a solvent sheath on PBI fibre size distribution

FIG. 3

Cross-sectional SEM of the electrolyte membrane of the invention; inset: magnified view where the PBI fibres are visible as nodules on the fractured surface

MEMBRANE

FIELD OF THE INVENTION

The present invention relates to an electrolyte membrane and its use in an electrochemical device, in particular its use in a proton exchange membrane fuel cell.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer which is porous and electrically conducting and allows the reactants to reach the electrocatalyst layer and conduct the electric current that is generated by the electrochemical reactions.

Conventional ion-conducting membranes used in PEMFCs are generally formed from sulphonated fully-fluorinated polymeric materials (often generically referred to as perfluorinated sulphonic acid (PFSA) ionomers). As an alternative to PFSA type ionomers, it is possible to use ion-conducting membranes based on partially fluorinated or non-fluorinated hydrocarbon sulphonated or phosphonated polymers. Recent developments in PEMFCs require membranes to be thinner (<50 µm) and of higher ion exchange capacity (IEC) or lower equivalent weight (EW) due to the advantages obtained (improved ionic conductivity, improved water transport etc) and thus, in order to provide the mechanical properties required to increase resistance to premature failure, a reinforcement, typically expanded polytetrafluoroethylene (ePTFE), is embedded within the membrane.

Although such reinforced membranes often have lower proton conductivity when compared to an unreinforced membrane of the same thickness, the improvement in mechanical properties has enabled thinner membranes of lower electrical resistance to be used.

Other types of reinforcement have also been proposed, for example as disclosed in WO2011/149732.

SUMMARY OF THE INVENTION

Although reinforced membranes such as those hereinbefore described have allowed thinner membranes to be used whilst maintaining mechanical strength, deficiencies still exist. In particular, limitations are seen in practical operation in which the conditions of humidity can vary quite significantly over short periods of time from relatively high levels (such as on start up from cold conditions) to quite dry levels (operation at maximum rated power density) where the membrane can degrade to a higher level than acceptable. In accelerated stress tests designed to mimic and accelerate this operation, a wet/dry cycling accelerated stress testing induces swelling/de-swelling of the membrane such that these membrane degradation effects can be more rapidly observed.

It is an object of the present invention to provide an improved electrolyte membrane, suitably for use in PEMFCs and PEM electrolysers.

The invention provides an electrolyte membrane comprising:

(i) a porous mat of nanofibres, wherein the nanofibres are composed of a non-ionically conducting heterocyclic-based polymer, the heterocyclic-based polymer comprising basic functional groups and being soluble in organic solvent; and (ii) an ion-conducting polymer which is a partially- or fully-fluorinated sulphonic acid polymer;

wherein the porous mat is essentially fully impregnated with ion-conducting polymer, and wherein the thickness of the porous mat in the electrolyte membrane is distributed across at least 80% of the thickness of the electrolyte membrane.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides an electrolyte membrane comprising a porous mat of nanofibres, the porous mat being essentially fully impregnated with an ion-conducting polymer.

The porous mat provides mechanical reinforcement to the electrolyte membrane.

The porous mat is formed from entangled nanofibres of a non-ionically conducting heterocyclic-based polymer comprising basic functional groups. The heterocyclic-based polymer is soluble in organic solvent, and in particular the polymer is soluble in N-methylpyrrolidone (NMP), dimethylformamide (DMF), dimethylacetamide (DMAc) or dimethylsulphoxide (DMSO), suitably DMAc or DMSO and preferably DMAc.

The nanofibres suitably have an average diameter of 100-400 nm, suitably 100-300 nm and preferably 150-250 nm.

The length of the nanofibres is not material to the invention, but each nanofibres should be sufficiently long (for example several centimetres) to become entangled, either with one or more other nanofibres or with itself.

The nanofibres are suitably spun nanofibres, i.e. the nanofibres are formed using a spinning technique. Examples of suitably spinning techniques include, but are not limited to, electrospinning and force spinning Heterocyclic polymers, preferably basic heterocyclic polymers, include polybenzimidazoles, poly(pyridine), poly(pyrimidine), polybenzthiazoles, polyoxadiazoles, polyquinolines, polyquinoxalines, polythiadiazoles, polytriazoles, polyoxazoles and polythiazoles and derivatives thereof. Suitably, the polymer is a functionalised polyazole or a zwitterionic polyazole, such as a polybenzimidazole, polytriazole, polythiazole and polydithiazole and their derivatives; most suitably a polybenzimidazole.

Suitably, the nanofibres are formed from a single heterocyclic-based polymer and not a blend of two or more heterocyclic-based polymers.

The heterocyclic-based polymer may also be cross-linked; i.e. one polymer chain is bonded to another polymer chain. Cross-linking may improve the mechanical stability of the electrolyte membrane.

The heterocyclic-based polymer may also have inherent radical scavenging properties. Such properties will be beneficial in the electrolyte membrane and provide protection against chemical degradation mechanisms such as damage from peroxy radical species. This will thus also contribute to providing a more durable membrane. The use of heterocyclic-based polymer having such properties will also obviate the need for the addition of additional materials with radical scavenging properties or hydrogen peroxide decomposition catalysts such as cerium cations, cerium dioxide, manganese dioxide or other additives into the electrolyte membrane, thus avoiding the associated disadvantages of incorporating these materials.

The porous mat has an open structure and porosity in the range of 70-98%, suitably 80-95%, suitably 85-95% and preferably 90-95%. The porosity is determined from the ratio of the volumetric mass of the porous mat, determined from its geometrical dimensions and its mass, to the known density of the polymer.

The porous mat has an average basis weight in the range 1 g/m$^2$ to 7 g/m$^2$, suitably in the range 1.5 g/m$^2$ to 3 g/m$^2$.

The porous mat in the electrolyte membrane suitably has a maximum thickness of 50 μm, 30 μm, suitably 25 μm and preferably 20 μm.

The porous mat in the electrolyte membrane suitably has a minimum thickness of 5 μm, suitably 10 μm.

To form the porous mat, nanofibres are formed, suitably by a spinning technique, onto a suitable substrate or surface. For example, the nanofibres may be formed using electrospinning: the electrospinning solution comprising the heterocyclic based polymer in a suitable solvent is pushed through a needle using a syringe pump and applying a high voltage to the needle. The mat of electrospun nanofibres is collected on a grounded rotating drum collector moving translationally and rotationally which is set at some distance from the needle, such as around 10-15 cm from the needle.

The fibre morphology is obtained through control of the solution parameters, such as concentration, whereas mat thickness and uniformity is controlled through deposition time and collector rotation/translation speed.

The porous mat is not subjected to any further processing, for example, any densification processes, such as calendaring, or welding etc.

The ion-conducting polymer is suitably a proton-conducting polymer and in particular a partially- or fully-fluorinated sulphonic acid polymer. Examples of suitable proton-conducting polymers include the perfluorosulphonic acid ionomers (e.g. Nafion® (E.I. DuPont de Nemours and Co.), Aciplex® (Asahi Kasei), Aquivion® (Solvay Specialty Polymer), Flemion® (Asahi Glass Co.).

The porous mat is essentially fully impregnated with ion-conducting polymer to form the electrolyte membrane. By "essentially fully impregnated" is meant that at least 80%, suitably at least 90%, suitably at least 95% and ideally 100% of the pores of the porous mat are filled with ion-conducting polymer.

Suitably, excess ion-conducting polymer is present on both surfaces of the electrolyte membrane to aid adhesion to a catalyst layer.

The porous mat may be impregnated with the ion-conducting polymer by the following process:

A layer of ion-conducting polymer (in solution/dispersion) is cast onto a carrier material. While the layer of ion-conducting polymer is still wet, the porous nanofibre mat is laid into the wet layer and the ion-conducting polymer impregnates into one face of the porous mat. A further layer of ion-conducting polymer is applied to a second face of the porous mat and impregnates into the porous mat from the second face. The impregnated porous mat is dried and suitably annealed to form the electrolyte membrane.

The solution/dispersion of ion-conducting polymer may comprise additional components, for example short nanofibres, e.g. from 1 to 50 μm.

Alternative methods for impregnating the porous mat with ion-conducting polymer will be known to those skilled in the art.

In the final electrolyte membrane of the invention, the weight ratio of ion-conducting polymer:nanofibres is suitably greater than 70:30 and preferably greater than 90:10. Suitably, the ion-conducting polymer:nanofibres ratio is less than 98:2. In this context, nanofibres refers to the nanofibres in the porous mat.

The thickness of the porous mat in the electrolyte membrane is suitably distributed across at least 80%, suitably at least 85%, and most suitably at least 90%, of the thickness of the final electrolyte membrane. The porous mat extends across the thickness of the membrane, such that the thickness of the electrolyte membrane and the thickness of the porous mat are essentially equal; however, practically, the thickness of the electrolyte membrane may be slightly thicker than that of the porous mat, such that the thickness of the porous mat is at most 99%, such as 95% of the thickness of the electrolyte membrane.

Having the porous mat distributed across at least 80% of the thickness of the electrolyte membrane enhances the stabilisation (mechanical and chemical) of the final electrolyte membrane.

An electrolyte membrane of the invention may comprise more than one porous mat e.g. two porous mats distributed across at least 80% of the thickness of the electrolyte membrane.

Figure 1:
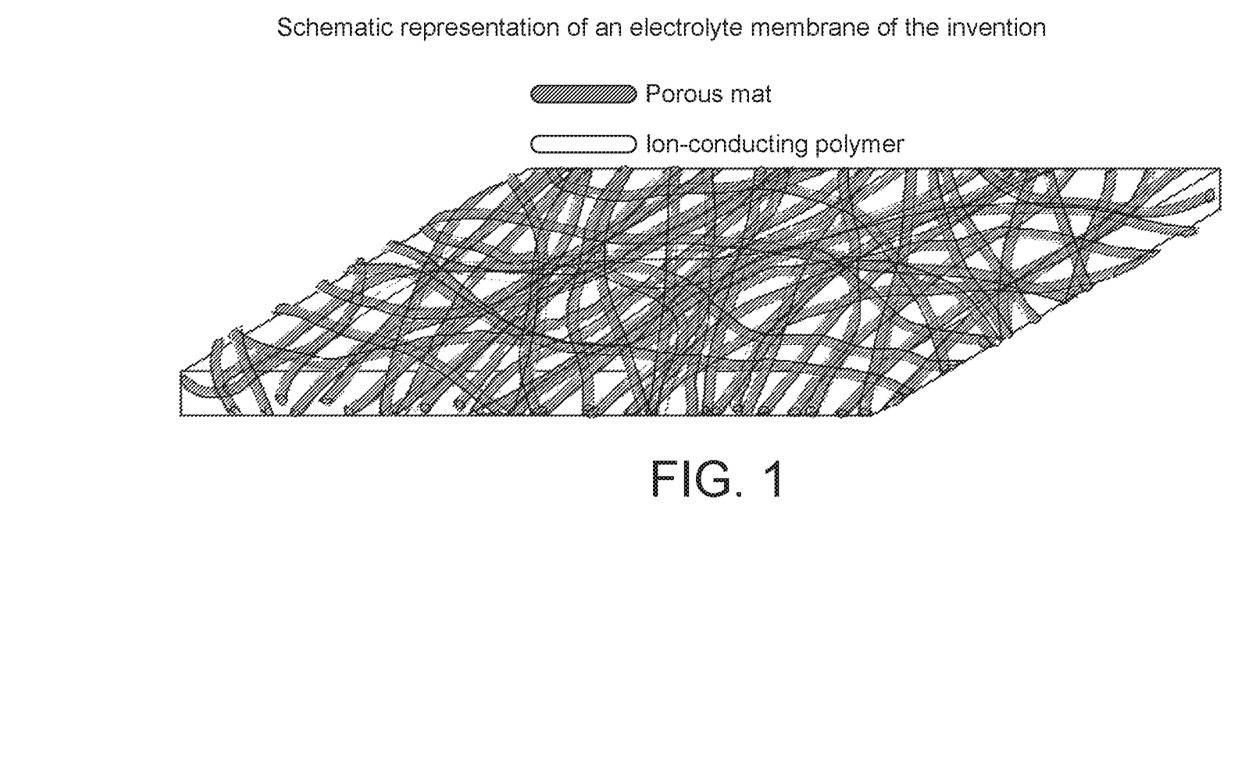
FIG. 1: Schematic representation of an electrolyte membrane of the invention.

FIG. 1 shows a schematic representation of an electrolyte membrane of the invention.

The invention also provides a catalysed electrolyte membrane comprising a catalyst layer and an electrolyte membrane of the invention.

The catalyst layer comprises one of more electrocatalysts. The one or more electrocatalysts are independently a finely divided unsupported metal powder, or a supported catalyst wherein small nanoparticles are dispersed on electrically conducting particulate carbon supports. The electrocatalyst metal is suitably selected from (i) the platinum group metals (platinum, palladium, rhodium, ruthenium, iridium and osmium),
(ii) gold or silver,
(iii) a base metal, or an alloy or mixture comprising one or more of these metals or their oxides.

The preferred electrocatalyst metal is platinum, which may be alloyed with other precious metals or base metals. If the electrocatalyst is a supported catalyst, the loading of metal particles on the carbon support material is suitably in the range 10-90 wt %, preferably 15-75 wt % of the weight of resulting electrocatalyst.

The exact electrocatalyst used will depend on the reaction it is intended to catalyse and its selection is within the capability of the skilled person.

The catalyst layer is suitably applied to a first and/or second face of the electrolyte membrane as an ink, either organic or aqueous (but preferably aqueous). The ink may suitably comprise other components, such as ion-conducting polymer as described in EP0731520, which are included to improve the ionic conductivity within the layer. Alternatively, the catalyst layer can be applied by the decal transfer of a previously prepared catalyst layer.

The catalyst layer may further comprise additional components. Such additional components include, but are not limited to, a catalyst which facilitates oxygen evolution and therefore will be of benefit in cell reversal situations and high potential excursions, or a hydrogen peroxide decomposition catalyst. Examples of such catalysts and any other additives suitable for inclusion in the catalyst layer will be known to those skilled in the art.

The invention further provides a membrane electrode assembly comprising an electrolyte membrane of the invention and a gas diffusion electrode on a first and/or second face of the electrolyte membrane.

The invention further provides a membrane electrode assembly comprising a catalysed electrolyte membrane of the invention and a gas diffusion layer present on the at least one catalyst layers.

The membrane electrode assembly may be made up in a number of ways including, but not limited to:

(i) an electrolyte membrane of the invention may be sandwiched between two gas diffusion electrodes (one anode and one cathode);
(ii) a catalysed electrolyte membrane of the invention having a catalyst layer on one side may be sandwiched between a gas diffusion layer and a gas diffusion electrode, the gas diffusion layer contacting the side of the catalysed electrolyte membrane having the catalyst component or;
(iii) a catalysed electrolyte membrane of the invention having a catalyst component on both sides may be sandwiched between two gas diffusion layers.

The anode and cathode gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc., or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

The invention further provides a fuel cell comprising an electrolyte membrane, a catalysed electrolyte membrane or a membrane electrode assembly as hereinbefore described. In one embodiment, the fuel cell is a PEMFC.

In addition to being used in PEMFCs, the electrolyte membrane of the invention will find use in any electrochemical device requiring such an ion-conducting polymer membrane, for example an electrolyser.

The invention will be further described with reference to the following example which is illustrative and not limiting of the invention.

Example 1

Membrane Fabrication

Poly[2,2'-(m-phenylene)-5,5'-bibenzimidazole] (PBI), obtained from PBI Performance Products Inc., was electrospun from a 13% solution in dimethyl acetamide (DMAc) using the following parameters: 15 kV applied voltage, 0.12 mL/hr flow rate; needle collector distance of 10 cm; drum collector rotation speed of 800 rpm; and translational speed of 10 mm/s. The electrospun mat was removed from the drum.

Figure 2:
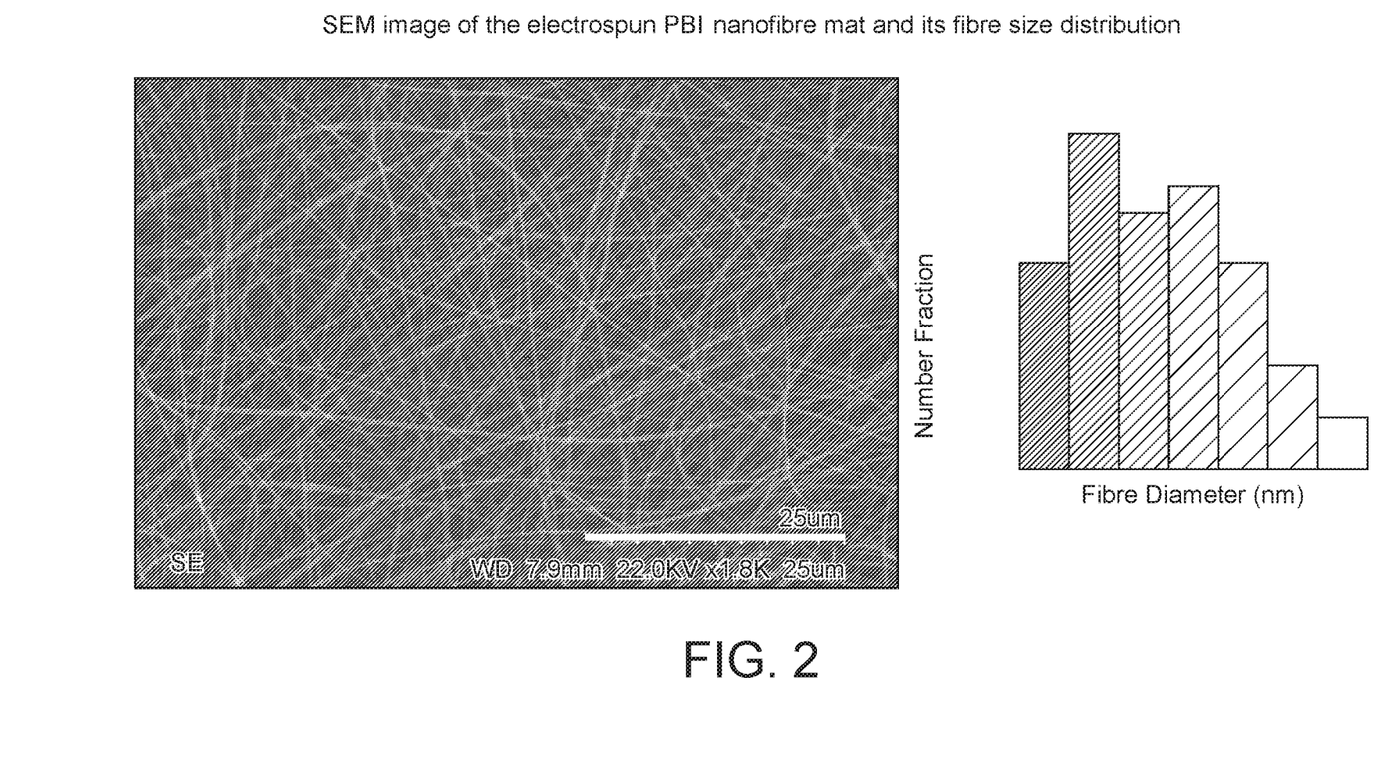
FIG. 2: SEM image of the electrospun polybenzimidazole (PBI) nanofibre mat and fibre size distribution of the example.

The PBI electrospun mat comprises randomly oriented nanofibres having an average fibre diameter of 200 nm, with a relatively narrow fibre diameter distribution between 140 and 280 nm, and are several tens of microns in length. FIG. 2 provides a scanning electron microscope (SEM) image of the electrospun mat showing the fibres are randomly oriented. Also shown in FIG. 2 is a graph showing the fibre diameter distribution.

Figure 3:
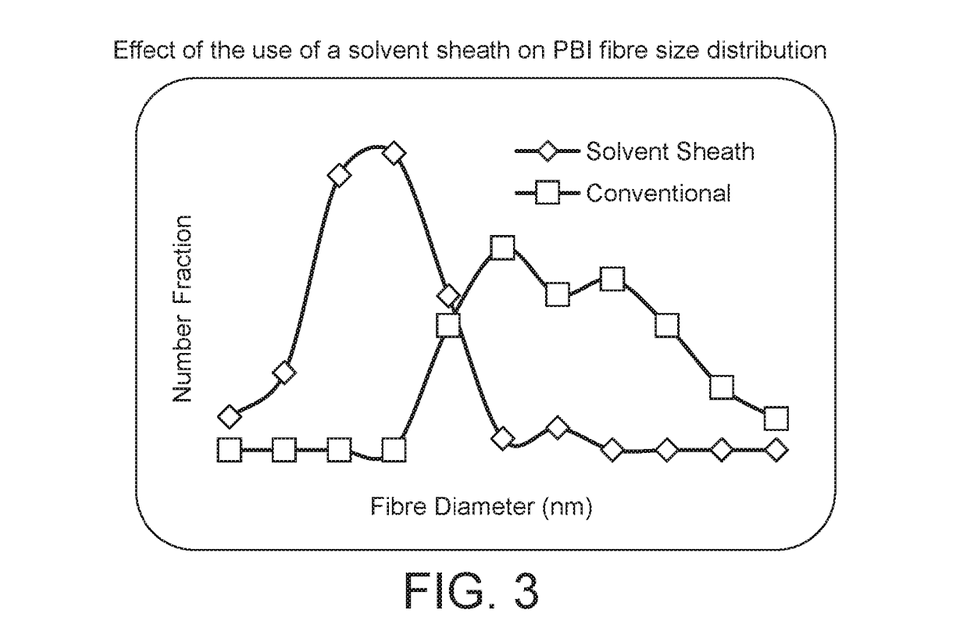
FIG. 3: Effect of the use of a solvent sheath on PBI fibre size distribution.

The thickness of the PBI nanofibres can be further controlled using co-axial needle electrospinning. The core solution is the PBI solution, and the sheath solution is DMAc. Through the use of a solvent sheath the evaporation and drying of the fibres that occurs during electrospinning is delayed, which results in greater stretching of the polymer nanofibres, and in thinner nanofibres in the final electrospun mat. Using a core/sheath flow rate ratio of 2/1, the average fibre diameter is 120 μm (range 60-180 nm) (see FIG. 3).

The electrospun PBI mat has a thickness of 10 μm, a porosity of 83% and a basis weight of 2.27 g/m$^2$.

A dispersion of a Aquivion® PFSA of equivalent weight 700 g/mol from Solvay Specialty Polymers (13% w/v in 60/35/5 in $H_2O$/1-propanol/DMAc) was cast onto a Teflon plate using the doctor blade method. The PBI electrospun mat was then placed directly on top of the cast PFSA dispersion. Impregnation of the cast PFSA dispersion into the nanofibre mat was confirmed visually, and a second layer of PFSA dispersion was then cast on top of the PBI electrospun mat. The overall membrane thickness was controlled through the gate thickness of the doctor blade. The cast electrolyte membrane was dried first at room temperature, followed by 80° C. overnight and then hot pressed (25 kg/cm$^2$) at elevated temperature (160° C.).

After solvent removal and hot-pressing, the electrolyte membrane had a nominal thickness of 30 μm and the electrospun PBI mat extended across approximately 85% of the thickness of the electrolyte membrane. The weight ratio of PFSA:nanofibres in the electrolyte membrane was 90:10.

Figure 4:
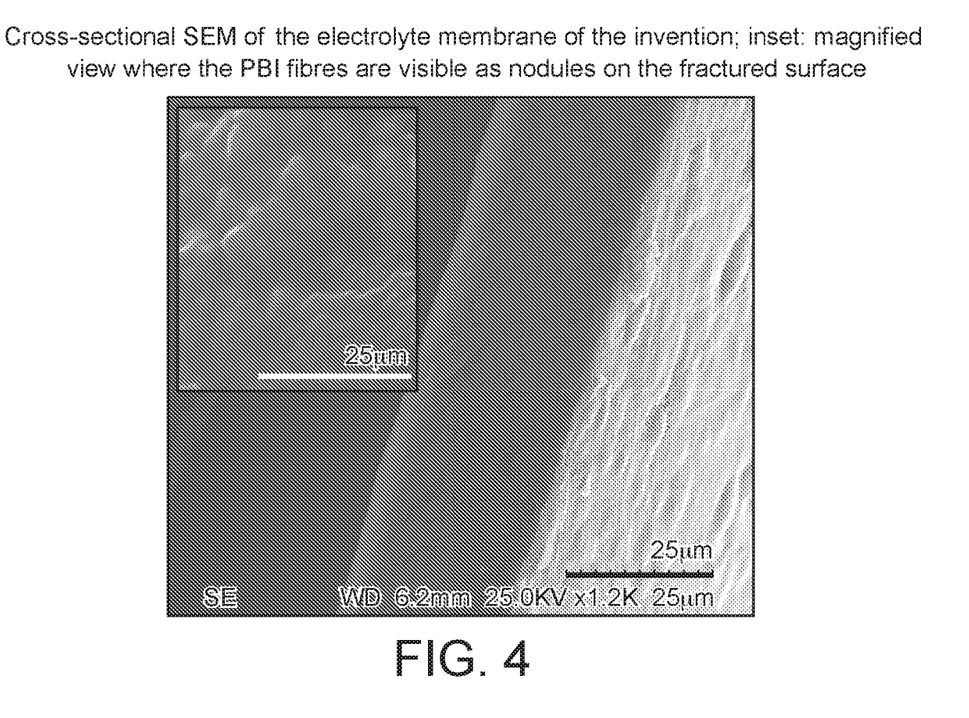
FIG. 4: Cross-sectional SEM of the membrane of Example 1.

A SEM image of the electrolyte membrane is given in FIG. 4. Cross-section SEM was done by freeze-fracturing the samples in liquid nitrogen. FIG. 4 shows that the electrospun mat allows for some displacement of the fibres during impregnation, resulting in the presence of the fibres throughout the cross-section of the electrolyte membrane. This has the benefit of reducing the barrier to proton conduction, as there is no PFSA-deficient region within the electrolyte membrane. It also allows for greater flexibility with the electrolyte membrane to accommodate mechanical stresses due to swelling. There was no visible separation between the nanofibres and the PFSA matrix after freeze-fracture, indicating an excellent interface between the electrospun mat and the PFSA. In the electrolyte membrane, the nanofibres appear to be fully immersed in the PFSA and the interface between the two is not distinct, indicating strong attachment of the PFSA to the surface of the nanofibres.

Example 2 (Comparative)

A solution of polyethersulphone (PES) of 20 wt % in DMAc/acetone was electrospun at 25° C. onto a rotating and translating drum collector. The nanofibre mat was collected and pressed at 140° C. A dispersion of a Aquivion® PFSA of equivalent weight 700 g/mol from Solvay Specialty Polymers (13% w/v in 70/30 in H$_2$O/1-propanol) was cast onto a Teflon plate using the doctor blade method. The PES electrospun mat was then placed directly on top of the cast PFSA dispersion. A second layer of PFSA dispersion was then cast on top of the PES electrospun mat. The overall membrane thickness was controlled through the gate thickness of the doctor blade. The cast electrolyte membrane was dried at 50° C., then at 120° C. and then 145° C.

Example 3 (Comparative)

A 30 μm unreinforced membrane prepared from Aquivion® PFSA with an equivalent weight of 790 g/mol (EW 790).

Example 4 (Comparative)

A 30 μm unreinforced membrane prepared from Aquivion® PFSA with an equivalent weight of 700 g/mol (EW 700), as used in Example 1.

Swelling, water uptake and proton conductivity measurements of the membranes were measured at 80° C.

The in-plane proton conductivity was determined on samples of dimension ca. 25×5 mm using a Bekktech 4-point probe set-up and measurement cell with controlled temperature and relative humidity (RH). Resistance measurements were performed at 80 and 110° C. over the RH range of 50-95%. The measurements at 110° C. were carried out at a cell pressure of 206 kPa. The results are given in Table 1 as an average of three measurements. Membrane water uptake was determined by weighing samples of dimensions 3×3 cm (cut using a template) before and after immersion in water at 80° C. overnight. The membrane dimensional swelling was determined on the same samples by measuring the sample dimensions before and after immersion in water.

TABLE 1

|  | Swelling (vol %) | Mass Uptake (%) | Proton Conductivity at 80° C. and 95% RH (mS cm$^{-1}$) |
|---|---|---|---|
| Example 1 | 19 | 100 | 173 |
| Example 3 | 66 | 59 | 126 |
| Example 4 | 135 | 141 | 192 |

The percentage swelling in water is much reduced for the membrane of Example 1 compared to the membranes of Examples 3 and 4, which is believed to be due to the ionic interaction between the electrospun PBI mat and the PFSA ionomer. The proton conductivity of Example 1 is higher than that of Example 3 and comparable to that of Example 4.

Mechanical tensile strength was measured using elastic modulus and elongation at break. Mechanical tensile measurements were performed on a Zwick Roell Z1.0 instrument with a 200N static load cell equipped with a controlled humidity/temperature chamber and TestXpert V11.0 software. The tests were performed on samples of 100×5 mm strips using a draw rate of 1 mm/s and a clamp distance of 10 mm. For measurements at elevated temperature/RH, the samples were kept under the required conditions overnight, then mounted and equilibrated for 1 h in the sample chamber and pre-tensioned before the measurements to take into account any swelling of the membrane. The results are given in Table 2.

TABLE 2

|  | Conditions | E (MPa) | Elongation at Break (%) |
|---|---|---|---|
| Example 1 | Ambient, RT | 539 ± 10 | 25 ± 5 |
|  | 70° C., 80% RH | 145 ± 3 | 44 ± 20 |
| Example 3 | Ambient, RT | 149 ± 29 | 450 |
|  | 70° C., 80% RH | 48 ± 5 | 557 |
| Example 4 | Ambient, RT | 182 | 313 |
|  | 70° C., 80% RH | 40 | 315 |

The elastic modulus and yield point are all significantly higher for the membrane of Example 1 than the membranes of Examples 3 and 4, demonstrating that the membrane of Example 1 is stiffer and stronger, having lower elongation at break.

MEA Fabrication

MEA 1: The membrane of Example 1 and electrodes were cut using templates to 52×52 mm, and a subgasket was used to define an active area of 25 cm$^2$. The electrodes were standard electrodes having a platinum catalyst loading of 0.2 mg/cm$^2$ at the anode and 0.4 mg/cm$^2$ at the cathode. The MEAs were fabricated by hot-pressing at 150° C. for 5 minutes.

MEA 2 (Comparative): MEA 2 was prepared using the membrane of Example 2 following the fabrication method as described for MEA 1.

MEA 3 (Comparative): MEA 3 was prepared using the membrane of Example 3, following the fabrication method as described for MEA 1.

MEA 4: MEA 4 was prepared in a similar manner to that described above for MEA 1, using the membrane of Example 1, with the exception that the active area was 45 cm$^2$ and the MEA was fabricated by hot-pressing at 170° C. to 2 minutes.

MEA 5 (Comparative): MEA 5 was prepared using the membrane of Example 3 following the fabrication method as described for MEA 4.

MEA 6 (Comparative): MEA 6 was prepared using the membrane of Example 4, following the fabrication method as described for MEA 4.

Durability Testing

Figure 5:
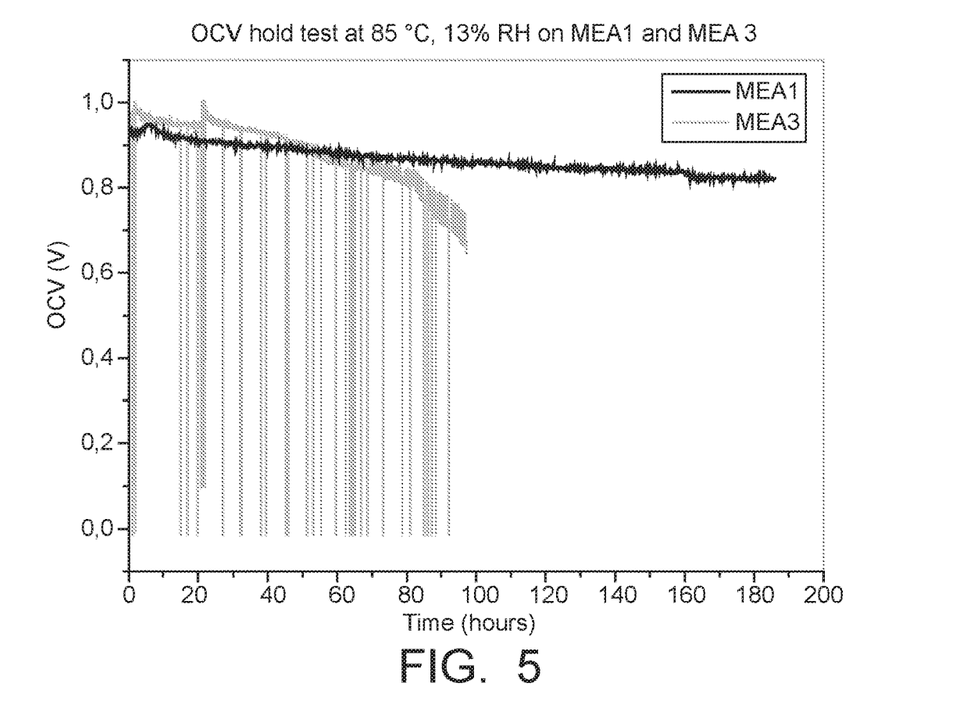
FIG. 5: OCV hold test at 85° C., 13% RH on MEA 1 and MEA 3.

Open Circuit Voltage (OCV) Hold Accelerated Stress Test:

OCV hold testing was performed under the following conditions to assess the durability of the membrane: Membrane electrode assemblies were held at open circuit voltage at 85° C. and 13% RH and the decrease of the cell voltage was monitored over time. As can be seen in FIG. 5, MEA 3 showed a significant drop in OCV, whereas MEA 1 shows much less decrease in OCV.

Figure 6:
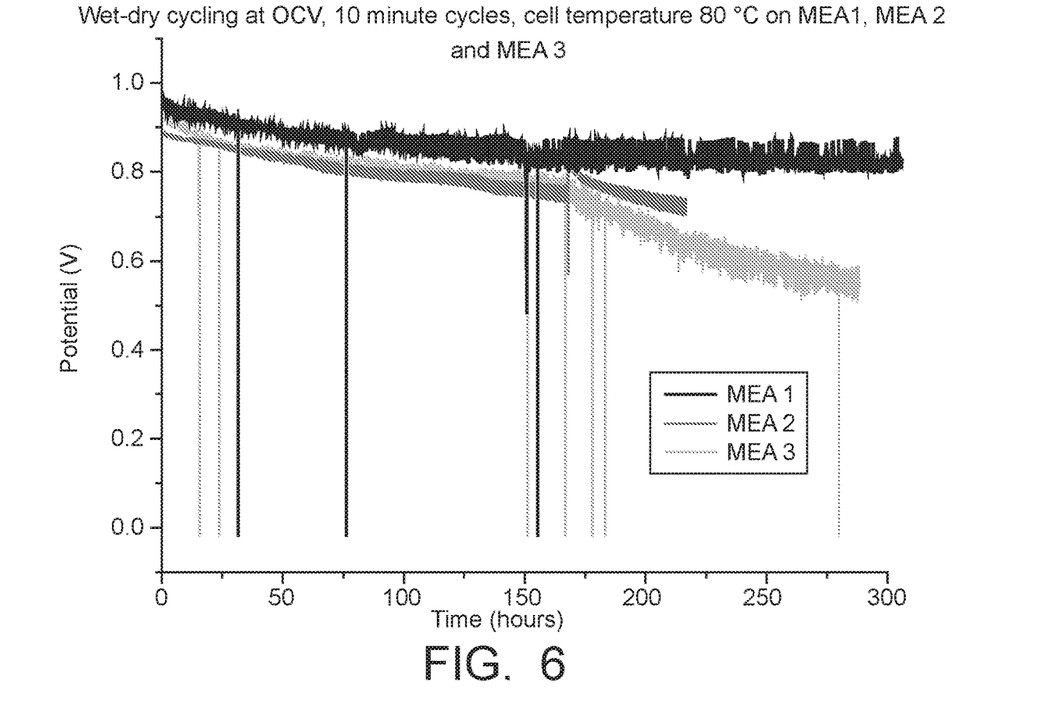
FIG. 6: Wet-dry cycling at OCV, on MEA 1, MEA 2 and MEA 3.

Wet-Dry Cycling Accelerated Stress Test:

Wet-dry cycling test was performed at 80° C. at OCV by cycling from 0% RH (10 minutes) to 90° C. dewpoint (10 minutes) to further assess the durability of the membranes against volumetric changes caused by hydration/dehydration. FIG. 6 shows that MEA 1 is much more stable compared to MEA 2 and MEA 3. After 150 hours, MEA 2 and MEA 3 shows an increase in the OCV decay rate whereas MEA 1 remains stable and shows a significantly reduced decay rate compared to MEA 2 and MEA 3, showing the nanofibre reinforcement provides mechanical strength and integrity against the stresses caused by volumetric changes upon hydration and dehydration, resulting in greatly improved stability.

Stack Durability Testing:

A short fuel cell stack comprising 9 MEAs of active area 45 cm$^2$ was built comprising 3 MEAs each of MEA 4, MEA 5 and MEA 6. The stack was operated under an accelerated durability test protocol, designed to replicate practical load cycling conditions for a fuel cell operating in the real environment. The test protocol included repeated periods of constant high current operation, followed by cycling between high current and low current conditions, and then switching from low current condition to shut-down and start up to low current conditions (i.e. repeated on-off cycling). The rapid cycling between these practical operational modes was designed to accelerate, over a shorter time, the performance characteristics that would be seen in a practical fuel cell operation over 10's of thousands of hours of real life operation. The accelerated testing cycles were performed at 50 kPag inlet pressure and 30% inlet relative humidity (RH) at 80° C. stack temperature. Gases were supplied at 1.5× stoichiometry for anode and 2.0× stoichiometry for the cathode. The durability test was run for almost 2,000 hours. Periodically during the durability test protocol the performance of the MEAs in the stack was measured by running a current vs voltage polarisation. These polarisation tests were performed at 70° C. stack temperature, ambient pressure, 100% RH on both anode and cathode. From the polarisation measurements operating on hydrogen/air a plot of the individual cell voltages versus time at a current density of 0.3 Acm$^{-2}$ were made. The cell voltages from each of the MEA types MEA 4, MEA 5 and MEA 6 were averaged from the 3 MEAs of each type incorporated in the short stack.

Figure 7:
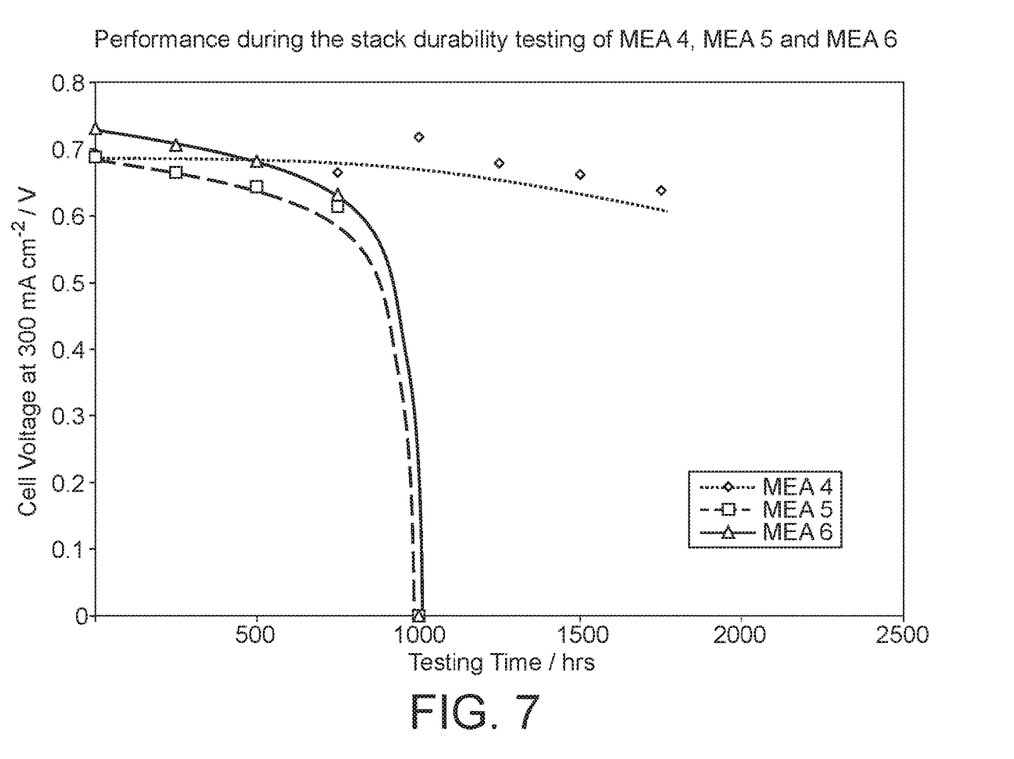
FIG. 7: Performance during the stack durability testing of MEA 4, MEA 5 and MEA 6.

The average MEA voltage durability for the three MEAs is shown in FIG. 7. As can be seen, MEA 5 and MEA 6 each experience a dramatic decrease in the performance (cell voltage) at around 750 hours, whereas MEA 4 maintains a very stable cell voltage throughout the 2000 hours of the test. This fuel cell stack durability test clearly demonstrates the significantly enhanced durability that is derived from the MEA using the reinforced membrane of the invention compared to other MEAs employing non-reinforced, but otherwise similar, membranes.

Overall, from the testing results it can be seen that the MEAs of the invention show improved durability beyond that demonstrated from the corresponding unreinforced membranes or membranes using a different type of reinforcement.

Without wishing to be bound by theory, the inventors believe this may be due to the phase separation and continuity of the electrospun mat and the ionic cross-linking (acid-base interaction, or hydrogen bonding) between the ion-conducting polymer and the surface of the nanofibres in the electrospun web. In addition, the electrospun mat allows greater swelling in the thickness direction as the fibres can move with respect to each other in this direction, but restricts swelling in the in-plane direction as the fibres are not elastic.

Furthermore, the heterocyclic based polymers used to form the electrospun mat have antioxidant properties and can contribute to the stability of the electrolyte membrane by scavenging damaging species such as peroxy free radicals. Due to these antioxidant properties, it may be that it is no longer necessary to incorporate antioxidants or hydrogen peroxide decomposition catalysts, such as ceria, into the membrane.

It is also thought that the strong non-covalent interactions between the nanofibres and the ion-conducting polymer may allow for reforming, or self-healing of the electrolyte membrane after minor damage such as pin-hole formation during operation. Such a reforming process would be promoted by application of pressure/temperature (conditions which already exist in the fuel cell during operation).

The invention claimed is:

1. An electrolyte membrane comprising:
    (i) a porous mat of entangled nanofibres, wherein the nanofibres are electrospun, and wherein the nanofibres are composed of a non-ionically conducting heterocyclic-based polymer, wherein the heterocyclic-based polymer is selected from the group consisting of polybenzimidazoles, poly(pyridine), poly(pyrimidine), polybenzthiazoles, polyoxadiazoles, polyquinolines, polyquinoxalines, polythiadiazoles, polytriazoles, polyoxazoles and polythiazoles and derivatives thereof, and the heterocyclic-based polymer comprising basic functional groups and being soluble in organic solvent, wherein the organic solvent is N-methylpyrrolidone, dimethylformamide, dimethylacetamide, or dimethyl sulphoxide; and
    (ii) an ion-conducting polymer which is a partially- or fully-fluorinated sulphonic acid polymer;
wherein the porous mat is essentially fully impregnated with ion-conducting polymer, and wherein the thickness of the porous mat in the electrolyte membrane is distributed across at least 80% of the thickness of the electrolyte membrane.

2. The electrolyte membrane according to claim 1, wherein the heterocyclic-based polymer is a polyazole or a derivative thereof.

3. The electrolyte membrane according to claim 2, wherein the polyazole is selected from the group consisting of polybenzimidazole, polytriazole, polythiazole and polydithiazole and their derivatives.

4. The electrolyte membrane according to claim 1, wherein the nanofibres have an average diameter of 100-400 nm.

5. The electrolyte membrane according to claim 1, wherein the porous mat has a porosity in the range of 70-98%.

6. The electrolyte membrane according to claim 1, wherein the porous mat has an average basis weight in the range 1.0 g/m2 to 7 g/m2.

7. The electrolyte membrane according to claim 1, wherein the ratio of ion-conducting polymer:nanofibres in the electrolyte membrane is greater than 70:30.

8. A catalysed membrane comprising an electrolyte membrane according to claim 1 and a catalyst layer on a first and/or second face of the electrolyte membrane.

9. A membrane electrode assembly comprising an electrolyte membrane according to claim 1 and a gas diffusion electrode on a first and/or second face of the electrolyte membrane.

10. A membrane electrode assembly comprising a catalysed membrane according to claim 8 and a gas diffusion layer on the catalyst layer.

11. A proton exchange membrane fuel cell comprising an electrolyte membrane according claim 1.

12. An electrolyser comprising an electrolyte membrane according to claim 1.

13. A proton exchange membrane fuel cell comprising a catalysed membrane according to claim 8.

14. A proton exchange membrane fuel cell comprising a membrane electrode assembly according to claim 9.

15. A proton exchange membrane fuel cell comprising a membrane electrode assembly according to claim 10.

* * * * *